United States Patent [19]
Loewen et al.

[11] Patent Number: 5,921,617
[45] Date of Patent: Jul. 13, 1999

[54] LONGITUDINALLY AND VERTICALLY ADJUSTABLE TRAILER UNDERBODY FAIRING

[76] Inventors: Gordon Loewen; Llana Belle Loewen, both of c/o Gorlan Fairing Inc. B260 - 355 Burrard Street, Vancouver, British Columbia, Canada, V6C 2G8

[21] Appl. No.: 08/797,437

[22] Filed: Feb. 10, 1997

Related U.S. Application Data

[63] Continuation-in-part of application No. 08/667,201, Jun. 20, 1996.

[51] Int. Cl.⁶ .................................................. B62D 35/00
[52] U.S. Cl. ......................................................... 296/180.4
[58] Field of Search ............................. 296/180.1, 180.2, 296/180.4

[56] References Cited

U.S. PATENT DOCUMENTS

| | | |
|---|---|---|
| D. 354,726 | 1/1995 | Fitzgerald et al. . |
| 2,605,119 | 7/1952 | Earngst ............................. 280/851 X |
| 4,142,755 | 3/1979 | Keedy . |
| 4,257,640 | 3/1981 | Wiley . |
| 4,257,641 | 3/1981 | Keedy . |
| 4,451,074 | 5/1984 | Scanlon . |
| 4,486,046 | 12/1984 | Whitney et al. . |
| 4,640,541 | 2/1987 | FitzGerald et al. . |
| 4,746,160 | 5/1988 | Wiesemeyer . |
| 4,817,976 | 4/1989 | Kingslay ............................ 280/851 X |
| 4,818,015 | 4/1989 | Scanlon . |
| 5,277,444 | 1/1994 | Stropkay . |
| 5,280,990 | 1/1994 | Rinard ................................ 296/180.1 |

FOREIGN PATENT DOCUMENTS

| | | |
|---|---|---|
| 487153 | 3/1975 | Australia . |
| 524568 | 9/1979 | Australia . |
| 68185/87 | 7/1987 | Australia . |
| 1254250 | 5/1989 | Canada . |
| 050200 | 4/1982 | European Pat. Off. . |
| 2321418 | 3/1977 | France . |
| 2739826 | 4/1997 | France . |
| 46-3932 | 2/1971 | Japan . |
| 46-36004 | 12/1971 | Japan . |
| 50-28413 | 1/1975 | Japan . |
| 53-160144 | 12/1978 | Japan . |
| 54-72813 | 6/1979 | Japan . |
| 56-175275 | 12/1981 | Japan . |
| 58-58959 | 4/1983 | Japan . |
| 63-15102 | 10/1984 | Japan . |
| 4-44467 | 8/1987 | Japan . |
| 62-151193 | 9/1987 | Japan . |
| 64-52880 | 3/1989 | Japan . |
| 1-68271 | 5/1989 | Japan . |
| 2-43779 | 3/1990 | Japan . |
| 2-51983 | 4/1990 | Japan . |
| 2514567 | 9/1991 | Japan . |
| 3-104483 | 10/1991 | Japan . |
| 3-130776 | 12/1991 | Japan . |
| 4-59584 | 5/1992 | Japan . |
| 1528108 | 10/1978 | United Kingdom . |
| 2137941 | 10/1994 | United Kingdom . |
| WO 91/07305 | 5/1991 | WIPO . |

*Primary Examiner*—Dennis H. Pedder
*Attorney, Agent, or Firm*—Oyen Wiggs Green & Mutala

[57] ABSTRACT

A fairing attachable beneath a lower, outer longitudinal edge of a trailer. The fairing has longitudinally extending forward and rearward sections. The rearward section can be moved longitudinally to adjustably locate its rearward edge in a selected position forward of the trailer's wheel assembly. Such adjustable positioning occurs automatically if the rearward section is coupled to and longitudinally movable with the support frame for the trailer's wheel assembly, thus maintaining the rearward edge of the fairing in the selected position whenever the trailer's wheel assembly is longitudinally adjusted relative to the trailer. A hinge mechanism coupled between the trailer and the fairing allows pivotal displacement of each fairing section between lowered and raised positions. The lowered position is for long distance haulage of the trailer in order to achieve fuel economy. The raised position is for situations in which the trailer must be manoeuvred over ramps, uneven terrain, etc. which might contact the underside of or otherwise interfere with the fairing.

7 Claims, 6 Drawing Sheets

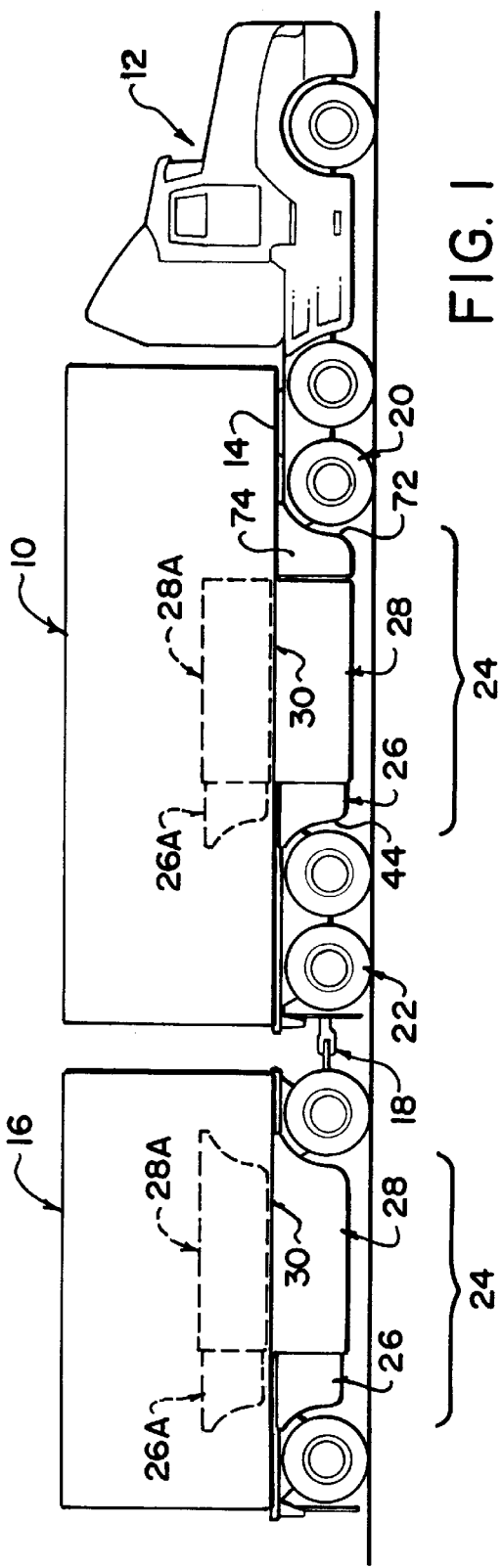
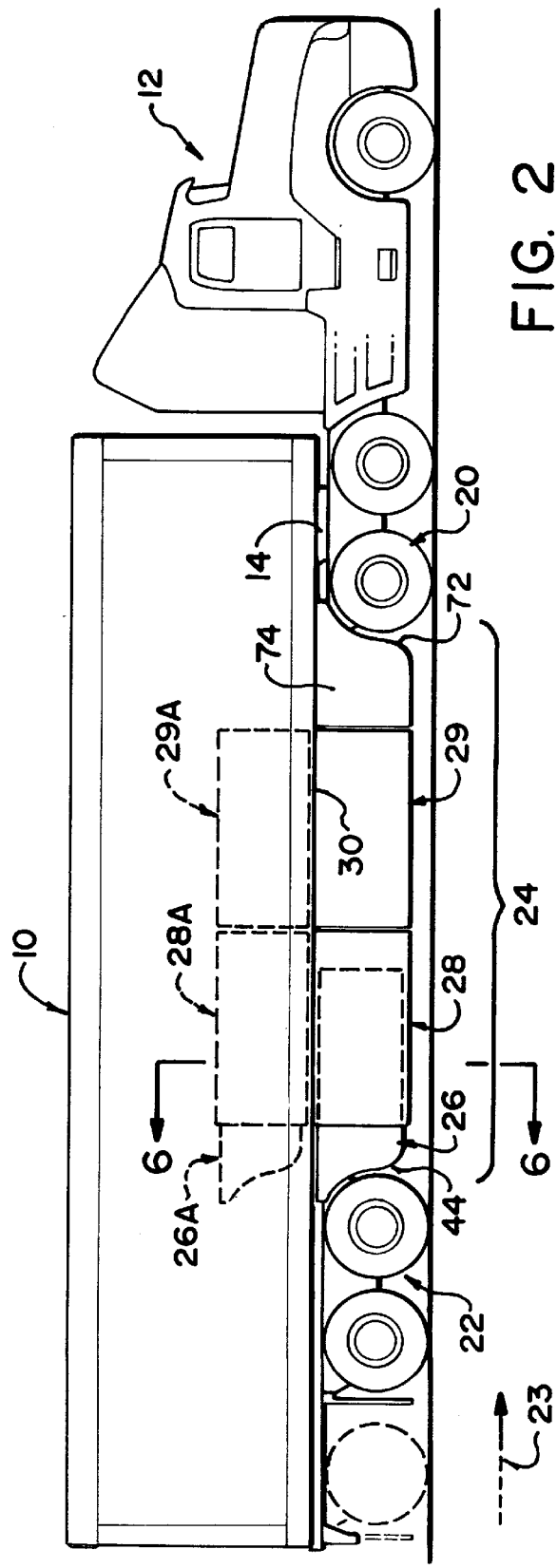

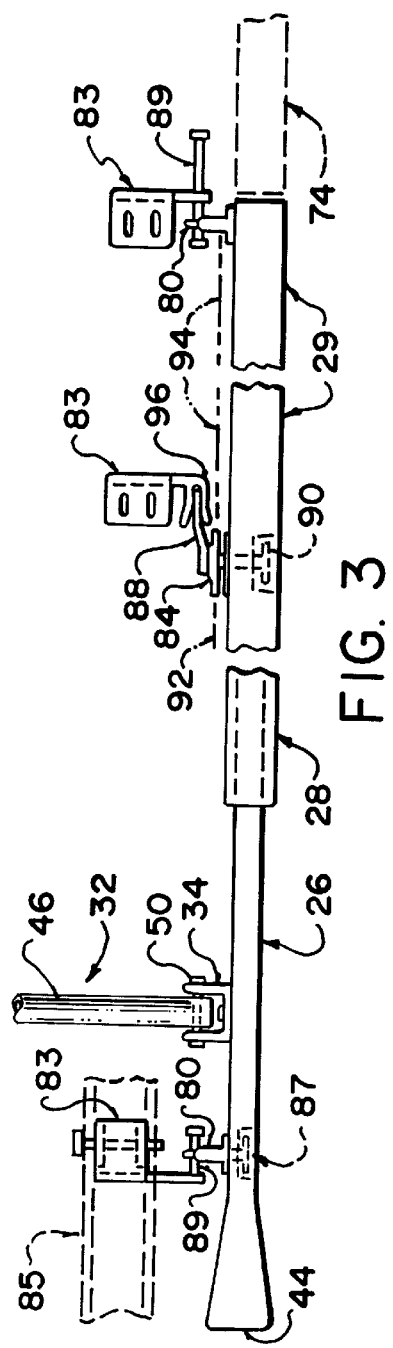
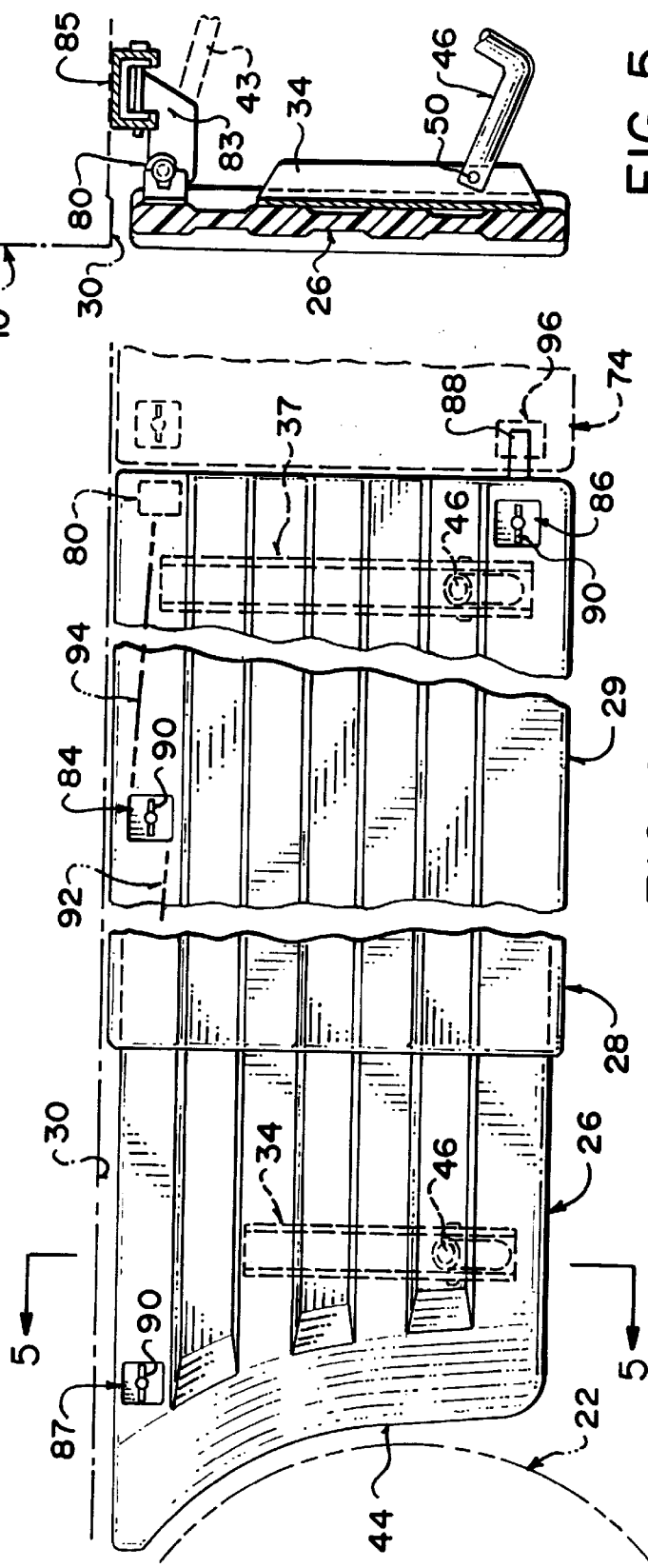
FIG. 3
FIG. 4
FIG. 5

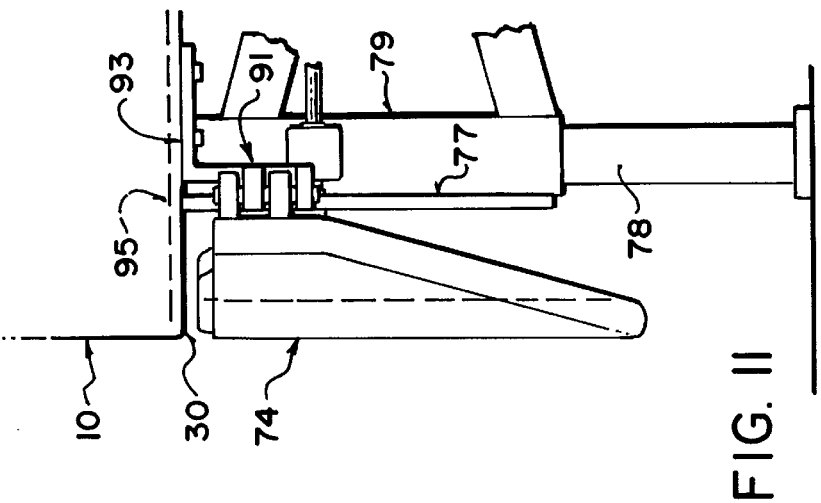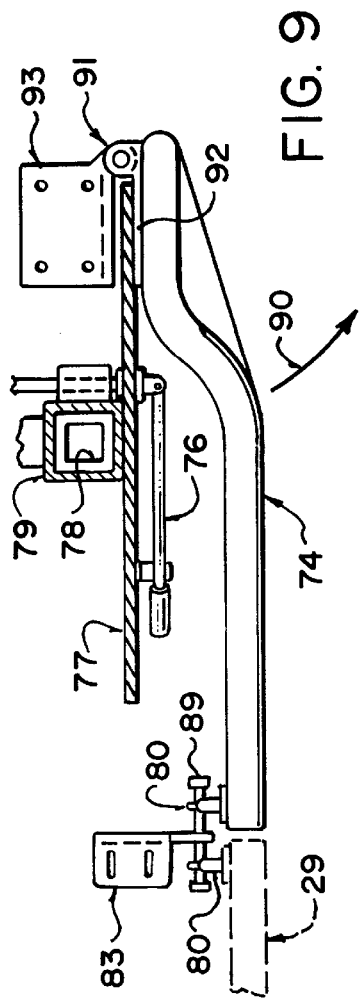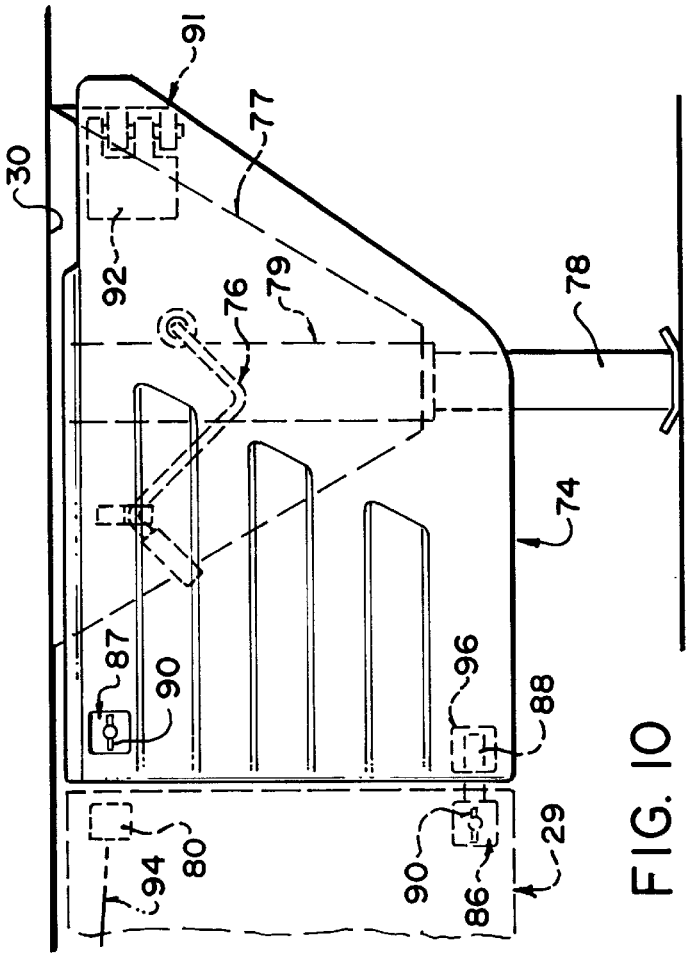

LONGITUDINALLY AND VERTICALLY ADJUSTABLE TRAILER UNDERBODY FAIRING

REFERENCE TO RELATED APPLICATION

This is a continuation-in-part of United States application Ser. No. 08/667,201 filed Jun. 20, 1996.

TECHNICAL FIELD

This application pertains to a trailer fairing for improving fuel economy in long distance haulage of trailers. The fairing, which has at least two longitudinally disposed sections, hingedly attaches beneath the trailer's lower, outer longitudinal edges. The rearward section can be longitudinally adjusted to maintain it in close proximity to the trailer wheel assembly. The hinge allows pivotal displacement of each fairing section between lowered and raised positions.

BACKGROUND

It is known that the amount of fuel required to haul a trailer over long distances can be reduced by equipping the trailer with a suitable aerodynamic fairing. One type of fairing is mounted beneath each of the trailer's lower, outer longitudinal edges to extend between the trailer wheel assembly and the wheels of the tractor unit used to haul the trailer. Improved fuel economy is achieved while the trailer is hauled at highway speeds over long distances with fairings mounted as aforesaid.

Typically, such fairings either cannot be vertically repositioned once they are attached to the trailer, or the fairing can be repositioned to only a limited extent and/or with difficulty. This is problematic if the trailer must be manoeuvred over ramps or uneven terrain which might contact the underside the fairing, or if it becomes necessary to conduct inspection or maintenance procedures beneath the trailer.

Additional problems arise if the fairing cannot easily be repositioned longitudinally relative to the trailer's wheel assembly. The trailer wheel assembly itself is commonly longitudinally repositioned relative to the trailer to achieve proper load distribution. If the fairing cannot quickly and easily be adjusted to accommodate repositioning of the wheel assembly, then the length of the fairing must be reduced to ensure that the wheel assembly can be repositioned throughout its entire range without interfering with the fairing. But, if the length of the fairing is reduced, a significant gap may remain between the fairing and the wheel assembly, unless the wheel assembly is in its furthest forward position. Such gaps reduce the fairing's efficiency and reduce its fuel cost saving benefits.

This invention overcomes the foregoing problems by providing a fairing which can quickly and easily be moved between a lowered long distance haulage position and a raised manoeuvring/maintenance position. When the fairing is raised the trailer can be manoeuvred over ramps, uneven terrain, etc. without contacting such obstacles; or, workmen may easily gain access beneath the trailer for inspection or maintenance procedures. The fairing automatically repositions longitudinally whenever the trailer wheel assembly is repositioned, thus maintaining a minimal gap between the fairing and the wheel assembly.

SUMMARY OF INVENTION

In accordance with the preferred embodiment, the invention provides a fairing which can be attached beneath the trailer's lower, outer longitudinal edge. The fairing has longitudinally extending forward and rearward sections. The rearward section can be moved longitudinally to adjustably locate its rearward edge in a selected position forward of and in close proximity to the trailer's wheel assembly. Such adjustable positioning occurs automatically if the rearward section is coupled to and longitudinally movable with the support frame for the trailer's wheel assembly, thus maintaining the rearward edge of the fairing's rearward section in the selected position whenever the trailer's wheel assembly is longitudinally adjusted relative to the trailer. A hinge mechanism coupled between the trailer and the fairing allows pivotal displacement of each fairing section between a lowered position and a raised position. The lowered position is for long distance haulage of the trailer in order to achieve fuel economy. The raised position is for situations in which the trailer must be manoeuvred over ramps, uneven terrain, etc. which might contact the underside of or otherwise interfere with the fairing.

BRIEF DESCRIPTION OF DRAWINGS

FIG. 1 is a side elevation view of a tractor unit hauling a main trailer and a pup trailer, both trailers having fairings in accordance with the invention.

FIG. 2 is a side elevation view of a tractor unit hauling a single trailer having a fairing in accordance with the invention.

FIG. 3 is a partially fragmented top plan view of the FIG. 2 fairing.

FIG. 4 is a side elevation view of the FIG. 3 assembly.

FIG. 5 is a section view taken with respect to line 5—5 of FIG. 4.

FIG. 9 is a top plan view of the forward portion of the FIG. 2 fairing and shows a portion of the trailer landing gear.

FIG. 10 is a side elevation view of the FIG. 9 assembly.

FIG. 11 is a front elevation view of the FIG. 9 assembly.

DESCRIPTION

Figure 6:
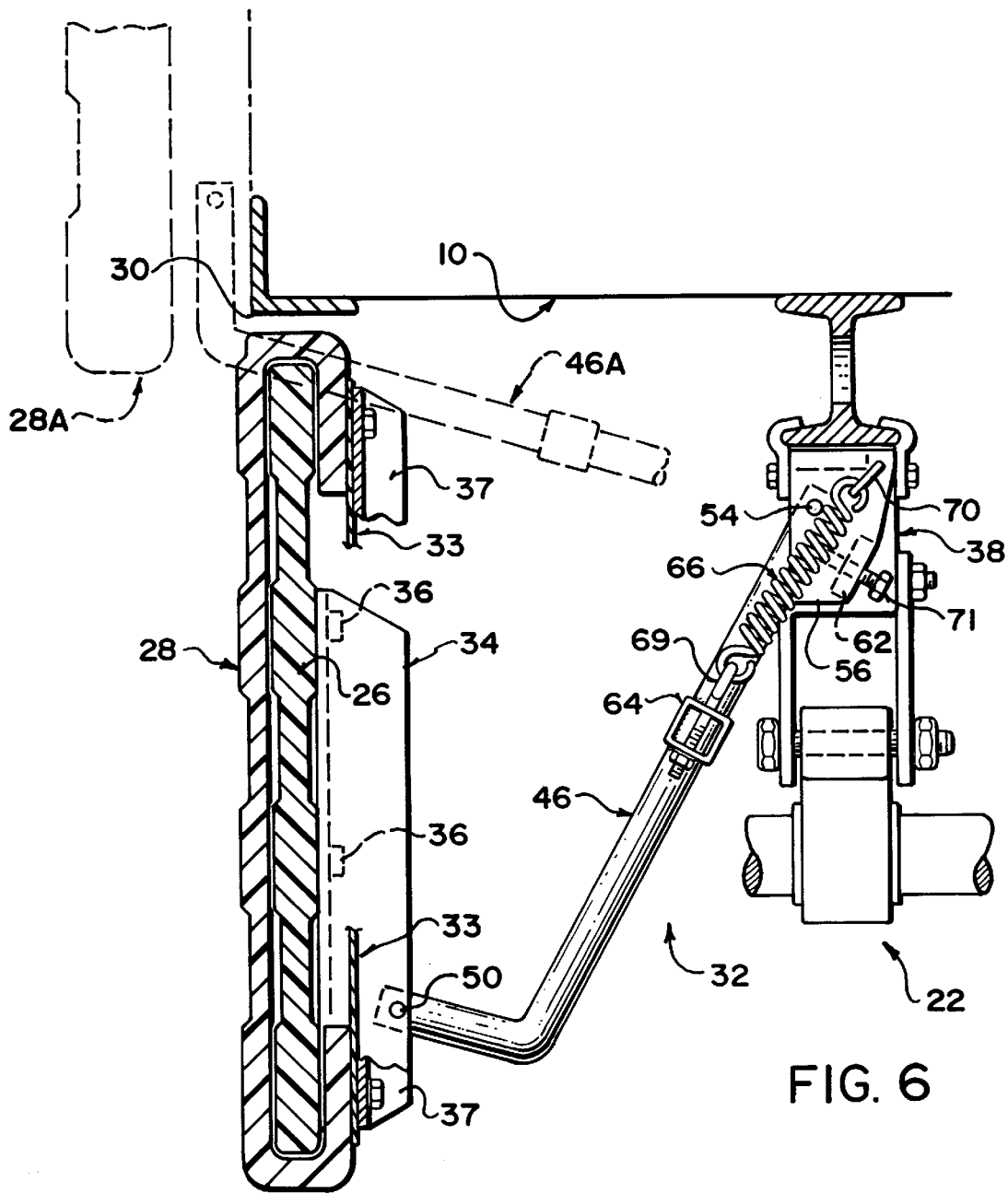
FIG. 6 is a section view taken with respect to line 6—6 of FIG. 2.

FIG. 1 shows a main trailer 10 coupled to tractor unit 12 via fifth wheel assembly 14, and a pup trailer 16 coupled to main trailer 10 via coupling 18. Fifth wheel assembly 14 is longitudinally adjustable relative to the rear wheel assembly 20 of tractor unit 12 to achieve proper forward load distribution by longitudinally repositioning the forward end of trailer 10 relative to wheel assembly 20.

FIG. 2 is similar to FIG. 1, but shows only a main trailer 10 coupled to tractor unit 12. Trailer wheel assembly 22 is longitudinally adjustable beneath the rear end of trailer 10 between the positions shown in dashed and solid outline in FIG. 2, as indicated by arrow 23. This enables proper rearward load distribution by repositioning the rearward end of trailer 10 relative to wheel assembly 22.

Fairings 24 having a rearward air deflector section 26 and one or more forward air deflector sections 28, 29 are mounted beneath the lower, outer longitudinal edges 30 of trailers 10, 16. In practice, two fairings are provided, one on either side of each trailer. Fairings 24 can be raised or lowered as hereinafter explained; and, fairing rearward section 26 can be longitudinally repositioned relative to fairing forward sections 28, 29 to accommodate longitudinal repositioning of wheel assembly 22 or to accommodate pup trailers having different wheelbases.

As best seen in FIG. 6, fairing forward section 28 is generally "C" shaped in cross-section. This allows the upper and lower portions of forward section 28 to act as channels which receive and guide longitudinally slidable movement of rearward section 26 during longitudinal repositioning thereof. A protective splash guard panel 33 may be releasably attached over the inward, open portion of forward section 28 to prevent debris, etc. from accumulating within the channel portions of forward section 28 and thereby impeding smooth sliding movement of rearward section 26 with respect to forward section 28.

Figure 7:
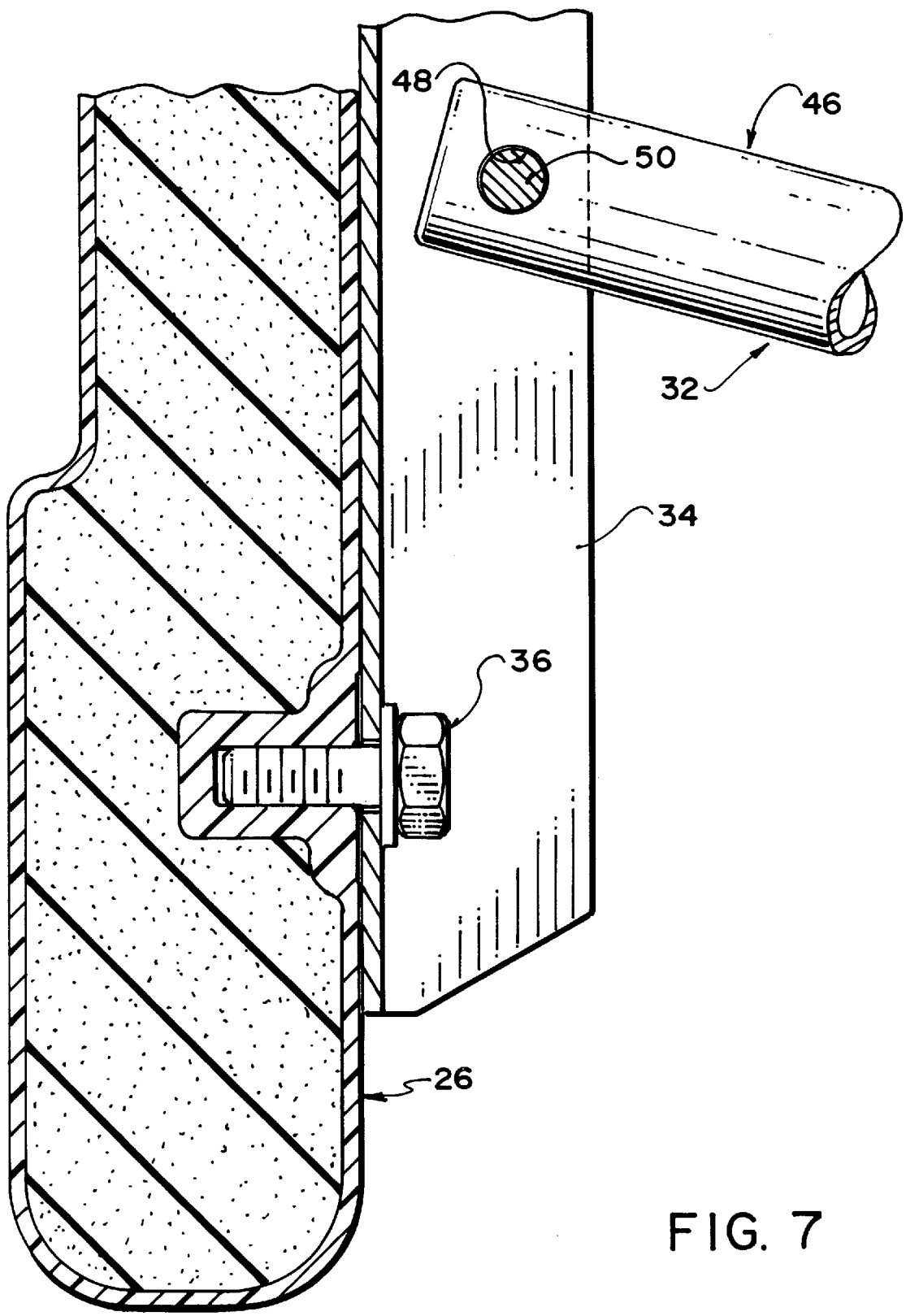
FIG. 7 is an enlarged illustration of the lower portion of the FIG. 5 assembly.

Fairing sections 26, 28, 29 can be made of a polyethylene plastic material filled with polypropylene foam, as depicted in FIG. 7 for section 26. The outer polyethylene sheath provides high impact resistance and resists shape distortion over a wide temperature range. The polypropylene filler improves structural integrity.

Hinges 32 (FIGS. 6, 7 and 8) connect fairings 24 to trailers 10, 16 to permit movement of fairings 24 between raised and lowered positions. The lowered position (shown in solid outline in FIGS. 1, 2 and 6) is used for long distance haulage of trailers 10, 16 in order to achieve fuel economy. The raised position (shown in dashed outline in FIGS. 1, 2 and 6 and denoted by appending the letter 'A' to reference numerals applied to raised parts) is used in situations where trailers 10, 16 must be manoeuvred over ramps, uneven terrain, etc. which might contact the underside of or otherwise interfere with fairings 24; or, to allow access beneath the trailers for inspection or maintenance procedures. Fairings 24 are of sufficient height to extend vertically, when in their lowered position, from the trailer's lower edge 30 to about thirteen inches above the road surface.

As shown in FIG. 3, the rearward portion of fairing rearward section 26 is flared to deflect air away from trailer wheel assembly 22 during highway speed haulage of trailer 10 over long distances with fairing 24 in the lowered position. When in their lowered positions, fairing sections 26, 28, 29 together constitute a substantially continuous air deflecting surface which extends below the trailer's lower edge 30, and between tractor rear wheel assembly 20 and trailer wheel assembly 22.

As shown in FIG. 6, rearmost hinge 32 pivotally connects between flange 34 and trailer wheel assembly support member 38. Flange 34 is fixed to the inward face of fairing rearward section 26 by bolts 36. Trailer wheel assembly support member 38 moves longitudinally relative to trailer 10 during longitudinal adjustment of wheel assembly 22 as aforesaid. More particularly, longitudinal adjustment of wheel assembly 22 longitudinally displaces support member 38, to which hinge 32 is fixed. Such displacement in turn displaces hinge 32. Accordingly, longitudinal adjustment of trailer wheel assembly 22 automatically longitudinally repositions fairing rearward section 26 relative to fairing section 28, thus maintaining rearward edge 44 (FIG. 4) of fairing rearward section 26 in a selected position in front of trailer wheel assembly 22. Preferably, rearward edge 44 is maintained in a position in front of trailer wheel assembly 22 which leaves only a narrow gap of about three inches therebetween.

Besides showing flange 34, FIG. 6 also shows flange 37 fixed to the inward face of fairing forward section 28. Flange 37 serves as a hinge connector for forward section 28, and is fragmented in FIG. 6 to avoid obscuring depiction of flange 34. Flange 37 must be fixed sufficiently forwardly on forward section 28 to prevent interference with slidable movement of rearward section 26 during longitudinal repositioning thereof.

Figure 8:
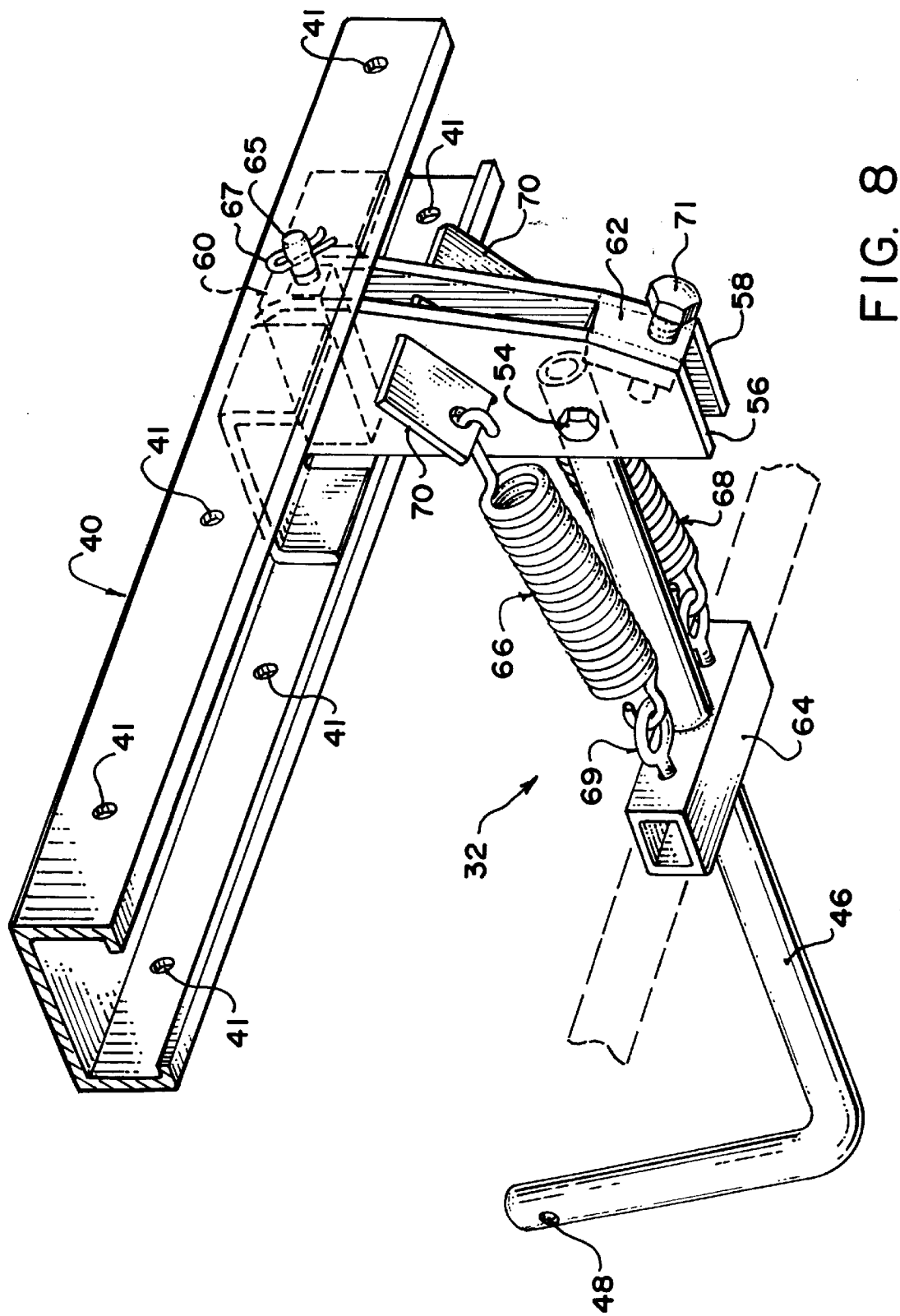
FIG. 8 is a pictorial illustration of a hinge for pivotally attaching a fairing section to a trailer in accordance with the invention.

As shown in FIG. 8, similar hinges 32 pivotally connect between fairing forward sections 28, 29 and support channel 40 which is fixed to and extends longitudinally along the underside of trailer 10. Unlike rearward section 26, forward sections 28, 29 do not move longitudinally with respect to trailer 10.

Hinges 32 are constructed as shown in FIGS. 6, 7 and 8. Rod 46 has an aperture 48 at one end through which pin 50 is inserted to pivotally couple the outward end of rod 46 to flange 34 (in the case of rearward section 26, as shown in FIGS. 6 and 7). Flange 34 is bolted to the fairing section's inward surface as aforesaid. Another pin 54 pivotally couples the inward end of rod 46 between plates 56, 58 which are fixed at their upper ends within support channel 40 in the case of forward sections 28, 29 as shown in FIG. 8. In the case of rearward section 26 as shown in FIG. 6, plates 56, 58 are fixed at their upper ends within wheel assembly support member 38.

Blocks 60, 62 are fixed between the upper and lower ends of plates 56, 58 respectively to maintain spacing and structural integrity thereof. Bolt 65 passes through apertures 41 in support channel 40 (in the case of forward sections 28, 29; or, through corresponding apertures in wheel assembly support member 38 in the case of rearward section 26) and through block 60, and is secured by cotter pin 67. This prevents further longitudinal displacement of each fairing section, once the respective sections are in their desired longitudinal positions.

Bracket 64 is fixed to a central portion of rod 46. Springs 66, 68 are mounted on opposite sides of rod 46 by connecting one end of each spring to bracket 64 via eye bolts 69, and connecting the opposite spring ends to plate 70 which extends through plates 56, 58. Springs 66, 68 assist in biasing fairing sections 26, 28 toward their respective raised positions (shown in dashed outline in FIG. 6) during operator manipulation thereof as hereinafter explained. Bolt 71 is threadably adjustable within block 62 to limit inward travel of rod 46 and thereby assist in aligning fairing 24 beneath the trailer's lower edge 30. Longitudinally extending bracing members (not shown) may be inserted between longitudinally adjacent pairs of brackets 64 to improve the structural integrity of each fairing section.

Although a narrow gap can be maintained as aforesaid between trailer wheel assembly 22 and rearward edge 44 of fairing rearward section 26, a considerably larger gap may sometimes be left between the forward edge 72 (FIGS. 1 and 2) of fairing 24 and tractor rear wheel assembly 20. This gap size depends in part upon the position of trailer 10 relative to tractor rear wheel assembly 20, as determined by adjustable repositioning of fifth wheel assembly 14. The gap size also depends upon the turning clearance required between tractor rear wheel assembly 20 (including any mud flaps mounted thereon) and fairing forward edge 72.

As shown in FIGS. 9, 10 and 11, the forwardmost portion of fairing 24 is configured to provide an access panel 74. An operator may manually grasp panel 74 and pivot it outwardly away from fairing 24 in the direction of arrow 90 to gain access to crank handle 76 which is used to raise or lower trailer landing gear 78. Access panel 74 is pivotally connected to landing gear support structure 79 by hinge 91, 92 adjacent landing gear gusset plate 77. Mounting plate 93 couples hinge portion 91 to plate 95 which forms the front underside of trailer 10. Hinge portion 92 is fixed to the inward surface of access panel 74.

As shown in FIGS. 3, 4 and 5, fairing forward sections 28, 29 are equipped with latches 80, 84 and 86 (only some of the latches on section 29 are visible, due to fragmentation of the drawings). Latch 80 and another identical latch (not shown) are respectively located in the upper, outer corners of fairing forward section 29. After moving forward section 29 into its lowered position, the operator presses against forward section 29 near the two upper corner latches to engage those latches with cooperating mechanisms 89 mounted in support channel 85 by brackets 83.

Latch 84 is located centrally between the upper corner latches, in the upper portion of fairing forward section 29. Handle 90 actuates lever arm 88 of latch 84. Handle 90 is also coupled by rods 92, 94 to the respective upper corner latches. After engaging the upper corner latches as aforesaid, the operator rotates handle 90 approximately 90° to move lever arm 88 into locking engagement within receiver 96 which is mounted in support channel 85 by another bracket 83. Rotation of handle 90 simultaneously extends rods 92, 94 to lock the upper corner latches. To release the latches, the operator rotates handle 90 approximately 90° in the opposite direction, withdrawing lever arm 88 from receiver 96 and simultaneously retracting rods 92, 94 to disengage the upper corner latches. Latch 86, which is similar to latch 84, is located near the lower forward corner of fairing forward section 29. The lever arm 88 of latch 86 engages a cooperating receiver 96 on the adjacent portion of access panel 74. Fairing rearward section 26, forward section 28 and access panel 74 are equipped with similar latches 87, as shown in FIGS. 3, 4, 9 and 10.

As will be apparent to those skilled in the art in the light of the foregoing disclosure, many alterations and modifications are possible in the practice of this invention without departing from the spirit or scope thereof. For example, instead of a two part polyethylene/polypropylene construction, one could alternatively form fairing sections 26, 28 from a single cross-linked polyethylene material such as high density polyethylene. But in such case, it may be necessary to form several longitudinally extending channels in each fairing section in order to improve the structural integrity of the fairing. As another example, FIG. 5 shows, in dashed outline, an alternative means 43 for connecting latch bracket 83 of fairing rearward section 26 to trailer wheel assembly support member 38 to allow bracket 83 to move during longitudinal repositioning of trailer wheel assembly 22 and fairing rearward section 26 as aforesaid. Accordingly, the scope of the invention is to be construed in accordance with the substance defined by the following claims.

What is claimed is:

1. A fairing attached beneath a lower, outer longitudinal edge of a trailer, said fairing comprising longitudinally extending forward and rearward sections, said rearward section having a connector coupled to a trailer wheel assembly of said trailer for longitudinal movement of said rearward section with said trailer wheel assembly to adjustably position a rearward edge of said rearward section in a selected position forward of said trailer wheel assembly and to maintain said rearward edge in said selected position notwithstanding longitudinal adjustment of said trailer wheel assembly relative to said trailer, said forward and rearward sections further hingeably coupled to said trailer for displacement of said sections between a lowered position and a raised position.

2. A fairing as defined in claim 1, wherein said fairing sections extend longitudinally, in said lowered position, between said selected position and a second position rearward of a tractor wheel assembly of a tractor coupled to said trailer.

3. A fairing as defined in claim 1, wherein said fairing sections extend longitudinally, in said lowered position, between said selected position and a second position rearward of a tractor wheel assembly of a tractor coupled to said trailer, and wherein said fairing sections are of sufficient height to extend vertically, in said lowered position, from said lower, outer longitudinal edge of said trailer to a selected distance above a road surface supporting said trailer.

4. A fairing as defined in claim 1, wherein said rearward section is longitudinally slidably connected to said forward section for adjustable longitudinal movement of said rearward section relative to said forward section, said forward and rearward sections together forming a substantially continuous air deflecting surface extending below a lower surface of said trailer.

5. A fairing as defined in claim 1, wherein said sections are of sufficient height to extend vertically, in said lowered position, from said lower, outer longitudinal edge of said trailer to a selected distance above a road surface supporting said trailer.

6. A fairing as defined in claim 1, wherein said forward section further comprises a plurality of longitudinally extending sub-sections.

7. A fairing as defined in claim 2, wherein said second position is defined by a forward edge of said forward section.

\* \* \* \* \*